Jan. 9, 1962     J. B. LONG     3,016,204
CONVEYOR HAVING LOAD PROCESSING MEANS
Filed Oct. 17, 1960     3 Sheets-Sheet 2
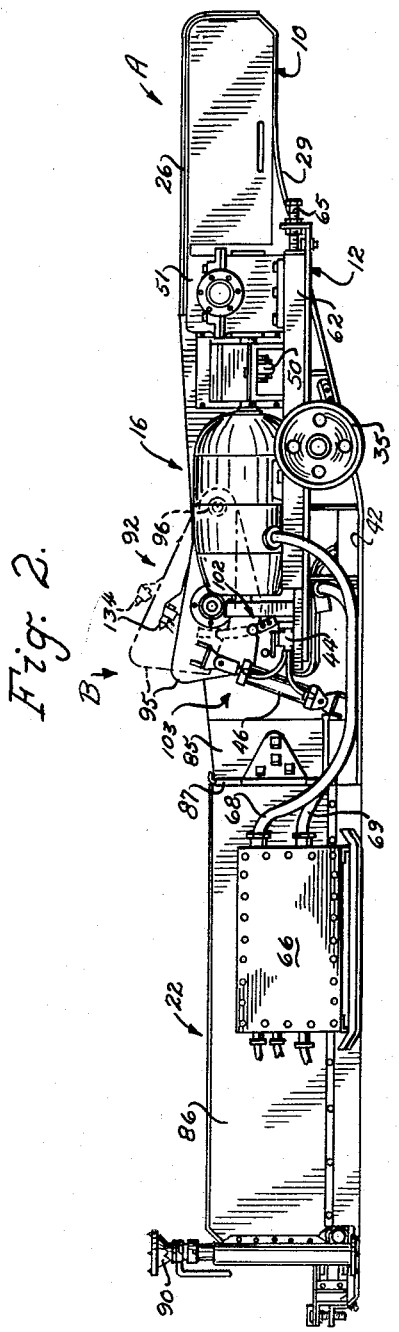
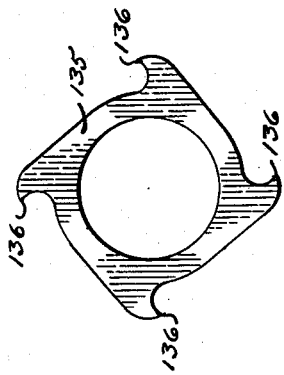
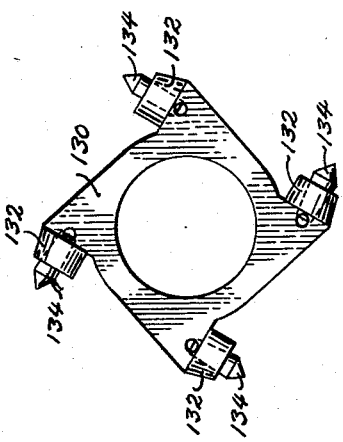
INVENTOR
John B. Long.
BY Rommel, Allere & Rommel
ATTORNEYS Jan. 9, 1962 J. B. LONG 3,016,204
CONVEYOR HAVING LOAD PROCESSING MEANS
Filed Oct. 17, 1960 3 Sheets-Sheet 3

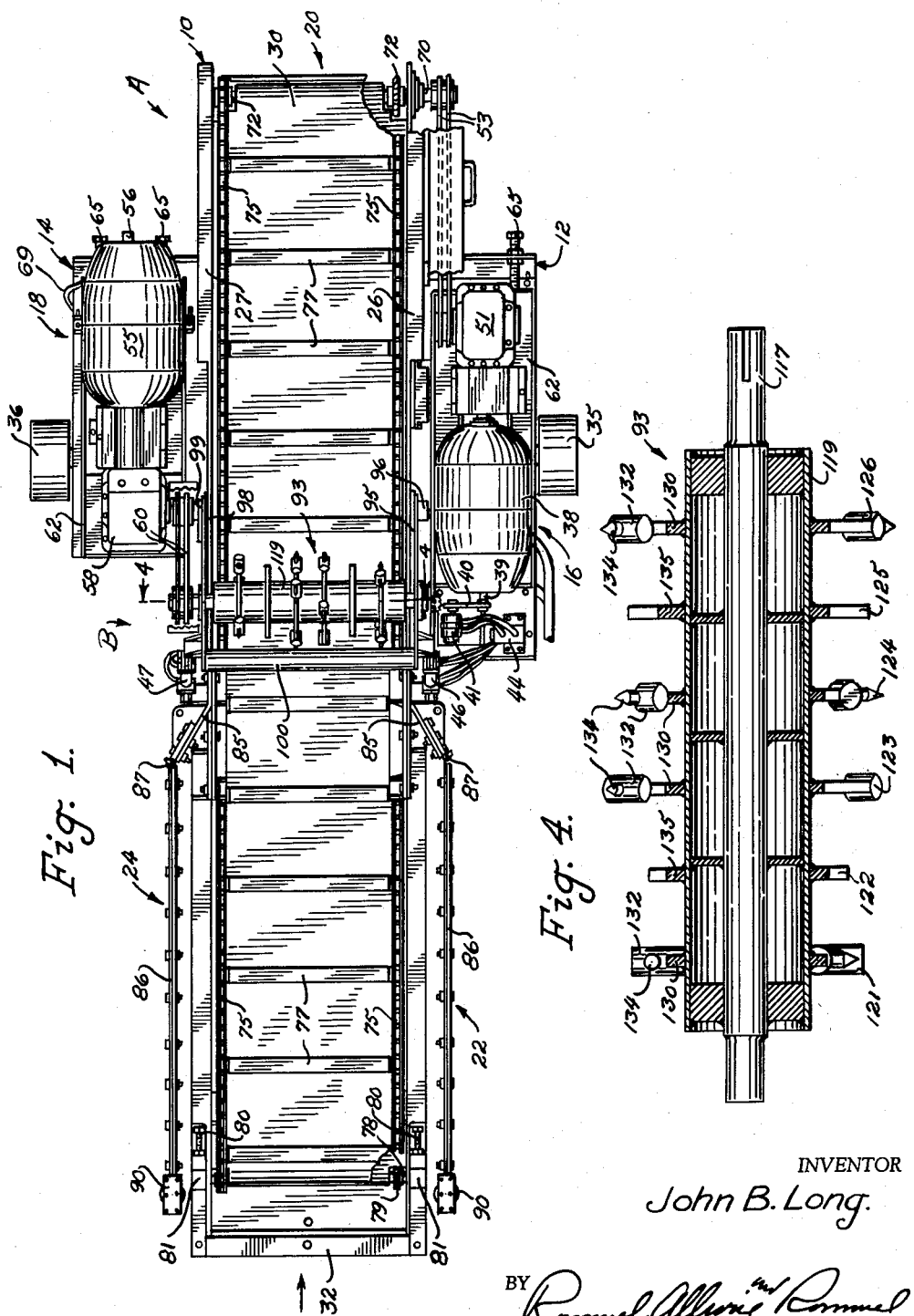

INVENTOR
John B. Long.
BY
ATTORNEYS

United States Patent Office 3,016,204
Patented Jan. 9, 1962

3,016,204
CONVEYOR HAVING LOAD PROCESSING MEANS
John B. Long, Oak Hill, W. Va., assignor to Marmon-Herrington Company, Inc., Indianapolis, Ind., a corporation of Indiana
Filed Oct. 17, 1960, Ser. No. 62,910
3 Claims. (Cl. 241—200)

This invention relates generally to conveyors having load processing means and more particularly to a loader type conveyor adapted to receive relatively large chunks of material and provided with means for shattering the large chunks into smaller pieces and depositing these smaller pieces upon a conventional conveyor.

This invention is primarily designed for use in the mining industry wherein belt conveyors are becoming the standard medium of haulage, and wherein the conveying of over-size lumps of the mined material upon such belt conveyors has been a frequent cause of conveyor breakdown and destruction, causing spillage, pounding action at the idlers, and extensive damage to the belting itself. My invention is designed to be installed at a loading point, to receive the mined material directly from a mine car, continuous miner, or other primary source, and to process this raw mined material for more facile conveying.

The disposition of my improved conveyor, with its load processing means, intermediate the primary source of the mined material and the main haulage conveyor, serves to increase the capacity of the main haulage conveyor, permits higher speed of conveying, permits wider idler spacing of the main haulage conveyor, extends the life of the conveyor, and minimizes maintenance on the main haulage conveyor.

The primary object of my invention is the provision of a heavy duty conveyor that is designed to withstand the impact shock of loading extremely large chunks of material thereon and to process the material thereon by shattering the same into relatively small lumps.

A further object is the provision of guide plates for the funneling of the large chunks of material into the load processing apparatus of the conveyor.

A further object is the provision of balanced load processing means for balancing the impact thereof with the chunks of material while shattering the same into small lumps.

A further object is the provision of novel shock absorber means for absorbing excessive shock of the load processing means when the shock load becomes sufficiently high so that rupture of the processing means is likely.

Other objects and advantages will be apparent during the course of the following detailed description, taken in connection with the accompanying drawings, forming a portion of this specification, and in which drawings:

FIG. 1 is a top plan view of my improved conveyor with parts thereof broken away to disclose preferred details.

FIG. 2 is a side plan view thereof.

FIG. 4 is an enlarged transverse sectional view taken substantially on the line 4—4 of FIG. 1.

FIG. 5 is a side elevation of one of the picks of the load processing means.

FIG. 6 is a side elevation of another of the picks of the load processing means.

Figure 3:
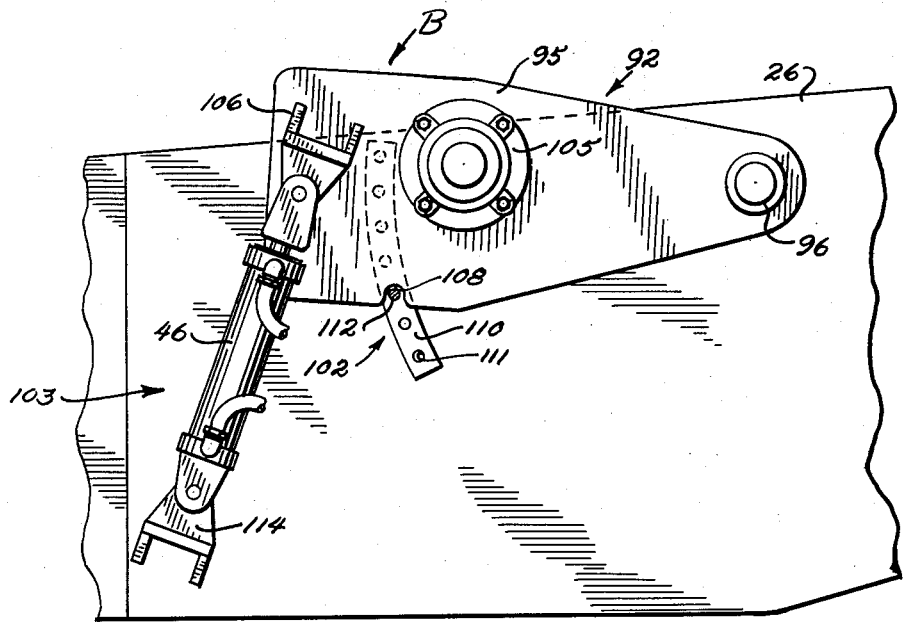
FIG. 3 is an enlarged fragmentary side view of a portion of my improved conveyor.

In the drawings, wherein for the purpose of illustration is shown a preferred embodiment of the invention, and wherein similar reference characters designate corresponding parts throughout the several views, the letter A may generally designate my improved conveyor, and B the load processing means thereof.

The conveyor A preferably includes a main frame 10, flanged side frames 12 and 14, provided for carrying power supply means 16 and 18, conveying means 20, and load guide means 22 and 24.

The main frame 10 preferably includes conventional conveyor sides 26 and 27, bottom plate 29, and supporting plate 30 which extend the length of the conveyor for supporting the conveying reach of the conveying means 20, and cross piece 32. Various other braces, extending transversely between the sides 26 and 27 may be provided for suitably bracing the conveyor. Wheels 35 and 36 may be provided upon the frame 10 to facilitate movement thereof.

The power supply means 16 preferably includes a motor 38 having a shaft 39 one end of which is connected, as by belt means 40, to a pump 41 for supplying hydraulic fluid from a supply tank 42, through control valve 44 to hydraulic cylinders 46 and 47 of the processing means B. The other end of shaft 39 is provided with a flexible coupling 50 that is interconnected to gear reducer 51. The gear reducer 51 is provided with power take-off means 53 for supplying power to the conveying means 20, as will be subsequently described.

The power supply means 18 includes a motor 55 having a shaft 56 that is interconnected with a flexible coupling (not shown) similar to the coupling 50 previously described with respect to the power supply means 16 which coupling is interconnected with a gear reducer 58. The gear reducer 58 is provided with power take-off means 60 for providing power to the processing means B, as will be subsequently described.

The power supply means 18 includes a motor 55 having a shaft 56 that is interconnected with a flexible coupling (not shown) similar to the coupling 50 previously described with respect to the power supply means 16 which coupling is interconnected with a gear reducer 58. The gear reducer 58 is provided with power take-off means 60 for providing power to the processing means B, as will be subsequently described.

Each of the power supply means 16 and 18 are mounted within cradles 62, which cradles 62 are slidably supported upon the flanged side frames 12 and 14, the power supply means 16 being supported upon the flanged side frame 12 and the power supply means 18 being supported upon the flanged side frame 14. Positioning means 65 are provided upon each of the flanged side frames 12 and 14 for maintaining the cradles 62 in juxtaposition upon the respective side frames 12 and 14, so that endless flexible power take-off means 53 and 60 may be properly tensioned.

Any suitable power source may be provided for actuating the motors 38 and 55 and, inasmuch as the particular embodiment of my invention disclosed in the drawings is for usage in coal mines (although it is to be understood that the usage of the invention is not to be so limited) I have shown a starter 66 having conventional explosion proof circuitry and provided with power supply lines 68 and 69 for supplying power to the power supply means 16 and 18, respectively.

Conveying means 20 preferably includes a head shaft 70, geared to power take-off means 53, provided with sprockets 72 that mesh with and provide the power to chains 75 which have flights 77 secured transversely therebetween, forming a chain and flight conveying means, and a tail shaft 78 having idler sprockets 79 thereon that engage the chains 75. The side frames 26 and 27 of the main frame 10 are provided with adjusting means 80 that engage the bearing housings 81, one each provided, to each end of tail shaft 79, one of each of the bearing housings 81 being slidably supported upon the respective side frames 26 and 27, so that by regulation of the adjusting means 80 the tail shaft 78 may be longitudinally adjusted with respect to the head shaft 70 and proper tensioning for the chains 75 provided.

The conveying reach of the conveying means is supported upon the plate 30 and the return reach of the conveying means 20 supported upon the bottom plate 29, as is conventional in chain and flight conveyors. The flights 77 serving to move the load along the supporting plate 30 from the loading position, adjacent the tail shaft 78, to the discharge end thereof, adjacent the head shaft 70. The load receiving end of the conveying means 20 is preferably positioned fairly close to the floor, so that a load may usually be received thereon at a height of approximately six inches above the floor level, and the discharge end of the conveying means 20 is somewhat elevated, in juxtaposition for discharge onto a main haulage conveyor, It is within the scope of my invention to include as a part of the conveying means the supporting plate 30 of the frame 10 and the supporting plate 10 may therefore be optionally referred to either as an element of the frame or as a portion of the conveying means.

Load guide means 22 and 24 each comprise a bracket 85 secured to the respective side frames 26 and 27, longitudinally extending plates 86, hinge means 87 interconnecting the plates 86 with brackets 85, and jacks 90 disposed at the opposite ends of the plates 86 from the hinge means 87 for fixedly securing the plates 86 in juxtaposition with respect to the conveying means 20. These load guide means 22 and 24 serve to engage and guide any extremely large lumps of material and, in fact, any lumps of material that may have become disengaged from contact with the conveying means 20, back on to the conveying means 20, and maintain the load in juxtaposition for engagement with the load processing means B.

The load processing means B is preferably mounted intermediate the loading and discharge end of the conveying means 20, the same being spaced from the loading end a sufficient distance to permit a complete load to be discharged upon the conveying means 20 prior to the engagement of the load processing means B with the load, and spaced from the discharge end of the conveying means 20 a sufficient distance to permit a degree of motion to be imparted to the processed load so that the same can be discharged upon the main haulage conveyor with a degree of motion in line with the direction with the movement of the main haulage conveyor.

The load processing means B preferably includes height regulating frame means 92 and load shattering means 93.

The height regulating frame means 92 preferably includes a side plate 95 that is hingedly mounted upon side frame 26 as by hinge means 96; side plate 98 that is hingedly mounted upon side frame 27 as by hinge means 99; transverse brace means 100 that extends between and interconnects side plates 95 and 98; minimal height adjusting means 102; and lift means 103.

Each minimal height adjusting means 102 preferably includes a plate 110 having a plurality of openings 111 therein, each of which is proportioned to receive and hold therein detent pin 112. The plate 110 is of an arcuate configuration so that the positioning of the detent pin 112 and the openings 111 thereof will be in abutment with each groove 108 of the side plates 95 and 98 as they swing about their respective hinge means 96 and 99. It will thus be seen that when the detent pins 112 are secured in predetermined openings 111, that the side plates 95 and 96 will be held at a minimal height corresponding to the abutment in their respective grooves 108 with detents 112. This regulates the height of the load shattering means 93 so that it will at no time be spaced closer to the load than is desired, thus providing a load shattering effect upon material that is of excessive size, but permitting the smaller material of the load to freely pass therebeneath.

The lift means 103 preferably includes the hydraulic cylinders 46 and 47, each of which cylinders is interconnected at one end thereof to respective brackets 106 disposed on the side plates 95 and 98, the other ends thereof being respectively secured to brackets 114 provided upon the respective side frames 26 and 27. This lift means 103 also serves as a shock absorber means, as will be subsequently described.

Load shattering means 93 preferably includes a shaft 117, the ends of which are respectively mounted in the bearing housings 105 on the plates 95 and 98; drum 119 mounted on the shaft 117, and pick means 121, 122, 123, 124, 125, and 126 mounted upon the drum 119.

The picks 121, 123, 124, and 126 include a main supporting frame bracket 130 having pick receiving sockets 132 spaced peripherally thereabout, each of the pick receiving sockets 132 having a pick 134 mounted therein. Inasmuch as the pick means 121, 123, 124 and 126 extend for a greater distance peripherally about the drum 119 than the picks 122 and 125, the impact load thereupon will be much greater, and therefore removable picks 134 are provided so that they may be easily replaced.

The picks 122 and 125 each include frames 135 having picks 136 disposed peripherally thereabout.

Picks 121 and 126 are disposed adjacent each end of the drum 119 with the picks 123 and 124 substantially centrally therebetween, pick 122 being mounted between picks 121 and 123, and pick 125 being mounted between picks 124 and 126. The variation in the size of picks is provided in order to somewhat reduce the load and shock upon the shaft 117 and provide more facile reduction of the load to the desired size.

It will thus be seen that any load passing along the conveyor will be supported upon the supporting plate 30 and this supporting plate, which is disposed immediately beneath the load shattering means 93, acts as an anvil which cooperates with the rotating picks of the load shattering means in reducing the size of material passing therealong to a predetermined maximum size.

The hydraulic system of this invention preferably includes an intake conduit 140 interconnecting the pump 41 and oil tank 42; an output conduit 141 interconnecting the pump 41 and the valve 44; a conduit 143 interconnecting the valve 44 with the upper end of hydraulic cylinders 46 and 47; a conduit 145 interconnecting valve 44 with the lowermost end of hydraulic cylinders 46 and 47; a conduit 146 interconnecting the valve 44 with the tank 42; a bypass conduit 147 provided interconnecting the conduit 143 with the conduit 146; a pressure indicating meter 149 interconnected with the conduit 143 for indicating the pressure therein; a relief valve 150 having a relief setting of 100 p.s.i. interconnected within the conduit 143 and provided with a relief pump conduit 151 leading to the conduit 147; and a check valve 152 interconnected within the conduit 147, intermediate the interconnection therewith of the conduit 151 and 143, the conduit 147 being interconnected to the conduit 143 intermediate the relief valve 150 and the hydraulic cylinders 46 and 47.

Figure 7:
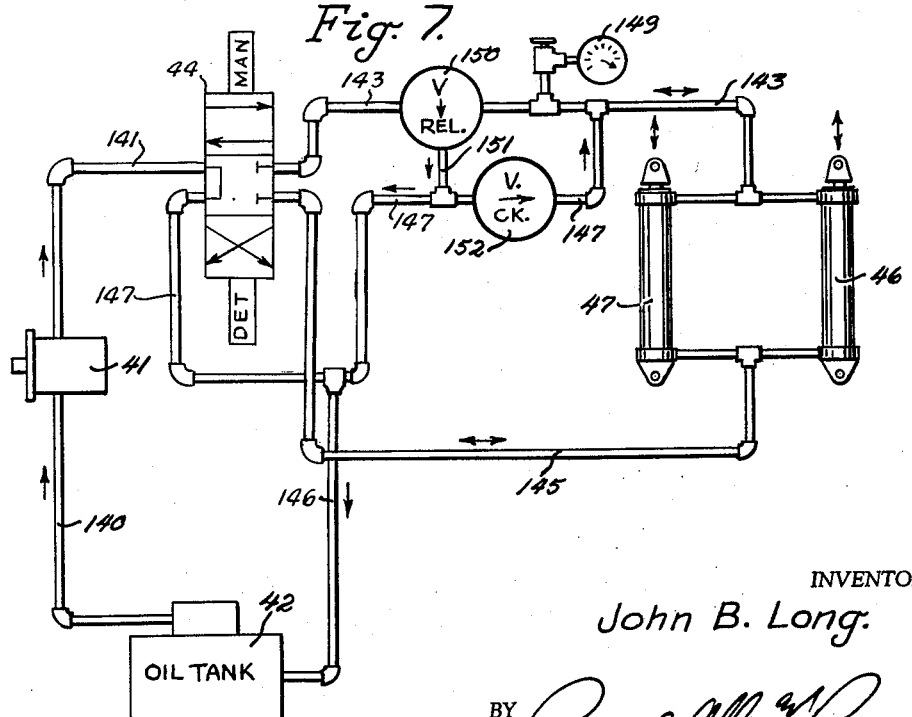
FIG. 7 is a diagrammatic view of the hydraulic system of my improved conveyor.

The valve 44 is a conventional four way, three position, detent positioned, manually controlled valve. The diagrammatic showing in FIG. 7 is in standard JIC symbols, the valve being shown in its neutral position, in which it would be held by a detent.

In normal operating position, it not being desired at that time to either raise or lower the processing means B, the pump 41 will draw hydraulic fluid through the conduit 140, out through conduit 141, through the valve 44, which is in neutral, at no load pressure, and dump to the tank 42 through conduits 147 and 146.

If it is desired to raise the processing means B, the valve 44 is actuated so that the hydraulic fluid flow is diverted through conduit 145, lifting the hydraulic cylinders 46 and 47. The hydraulic fluid will flow from the uppermost portions of these cylinders through conduit 143 to valve 44, and thence through conduits 147 and 146 back to the tank 42.

If it is desired to lower the cylinders 46 and 47, the valve 44 is actuated so that the hydraulic fluid under pressure from pump 41 is channeled through conduit 143, to the uppermost portion of the hydraulic cylinders 46 and 47, the fluid from the lowermost portions of these cylinders being ejected through conduit 145, through valve 44 and returned to the tank 42 through conduits 147 and 146.

The interconnection of the conduits 147 and 151, the relief valve 150, and the check valve 152 within the hydraulic system provide for the shock absorbing action of the means 103. Assuming that the processing means B has been disposed at a predetermined height, and the detent pins 112 inserted within the appropriate openings 111, it will be readily apparent that if the load shattering means 93 were not permitted any upward movement, any load exerting an excessive upward force would be quite likely to rupture the load shattering means. However, it is likewise true that the weight of the load shattering means 93 is not sufficient to maintain the downward pressure necessary for the shattering of a load, and a hydraulic system must therefore be provided that will maintain sufficient retaining force upon the load shattering means 93 in order to effect normal shattering action.

Under the present hydraulic system, if an excessive upward pressure is exerted, tending to lift the hydraulic cylinders 46 and 47, which pressure is in excess of 100 p.s.i., the fluid from the upper portion of the cylinders 46 and 47 will flow through the conduit 143, the pressure being sufficient to open the pressure relief valve 150, the fluid then flowing through the conduit 151 to conduit 147, and thence through conduit 146 to the tank 42. It is to be noted that no additional fluid is furnished to the lowermost portion of the hydraulic cylinders 46 and 47, so that a partial vacuum will be effected therein.

After the excessive upward pressure has passed beneath the load shattering means 93, so that the upward pressure on the cylinders 46 and 47 is less than 100 p.s.i., the relief valve 150 will close and the partial vacuum in the lowermost portion of the cylinders 46 and 47 will serve to retract these cylinders into their normal operating position. Make-up fluid for the uppermost portion of the cylinders 46 and 47, to replace the fluid dumped through the relief valve 150 and into the tank 42, will flow through check valve 152, through conduit 147, into conduit 143 and thence to the uppermost portion of the hydraulic cylinders. The valve 44 will be in its neutral position during this shock absorbing action.

Inasmuch as an operator will always be in a position to observe the operation of this apparatus, any objectionable load, which may not be shattered, may be promptly disposed of, either by shattering by manual operation or removal from the line of conveying, so that the objectionable load will not pass on to the main haulage conveyor, with likelihood of damage to the same.

The operation of the apparatus is as follows: load processing means B is first positioned at the desired spacing from plate 30 by actuation of the valve 44 that provides a fluid flow into the hydraulic cylinders 46 and 47 for the extension thereof, raising side plates 95 and 96 to a desired position, after which the detent pins 112 are inserted within the openings 111 for minimal height adjustment thereof and the valve 44 then actuated to lower the plates 95 and 96 so that their respective grooves 108 engage respective detent pins 112. The load shattering means 93 will now be spaced from the supporting plate 30 for the reduction of the size of material passing between the load shattering means 93 and the supporting plate 30 to a predetermined maximum size. The conveying means 20 is now actuated for movement of material from the loading end of the conveyor, past the load processing means B, and onto the discharge end of the conveyor; rotation of the shaft 117 of the load shattering means 93 is begun; and a load is deposited on the conveyor at the loading end thereof. The load will be moved along the conveyor into juxtaposition for the load processing operation wherein the rotating picks of the load shattering means 93 will strike any portion of the load that is in excess of a predetermined maximum size, thus shattering the indivdual pieces of the load that are of an excessive size to a size that is acceptable, and thence to the discharge end of the conveyor.

Various changes may be made to the form of the invention herein shown and described without departing from the spirit of the invention or the scope of the following claims.

I claim:

1. A conveyor having a loading end and a discharge end and including a frame, conveying means mounted upon said conveyor for moving a load from said loading end to said discharge end thereof, said conveying means including load moving means and shaft means for supporting said load moving means, load processing means including load shattering means mounted upon said conveyor for reducing individual pieces of a load upon said conveying means to a predetermined size as the load is moved along said conveyor by said conveying means, said load processing means including a pair of spaced apart side plates, means for movably securing one of said side plates to said conveyor frame adjacent each side of said conveying means, said load shattering means including a shaft extending transversely between said side plates and pick means mounted upon said shaft, means for rotatably supporting said shaft upon said side plates axially parallel to said shaft means of said conveying means, lift means attached to said side plates for positioning said shaft and said pick means of said load shattering means at variable spaced apart distances from said conveying means, power supply means mounted upon said conveyor, and means interconnecting said power supply means and said shaft of said load shattering means for providing a rotational force thereto independent of the movement of said conveying means through the entire range of variable spacing of said shaft and said pick means from said conveying means.

2. A conveyor as specified in claim 1 wherein said lift means comprises a pair of hydraulic cylinders, one of each of which is disposed to either side of said conveyor with one end thereof secured to said conveyor, the opposite end of each of said hydraulic cylinders being secured to one of said side plates, a hydraulic system for supplying pressure to said hydraulic cylinders, and valve means disposed within said hydraulic system for permitting extension of said hydraulic cylinders when a maximum predetermined force is exerted upon said load shattering means.

3. A conveyor having a loading end and a discharge end and including a frame, conveying means mounted upon said conveyor for moving a load from said loading end to said discharge end thereof, load shattering means mounted upon said conveyor for reducing individual pieces of a load upon said conveying means to a predetermined maximum size as the load is moved along said conveyor by said conveying means, and load guide means mounted adjacent said conveying means and positioned for guiding said load along said conveying means and into contact with said load shattering means, said load guide means including a pair of guide plates, pivot means for pivotally securing one end of each of said guide plates to said conveyor frame, adjacent said load shattering means, one of said guide plates longitudinally extending along each side of said conveying means from adjacent said load shattering means to adjacent the loading end of said conveyor, each of said guide plates being pivotally movable about said pivot means for variable spacing of the end of said guide plates adjacent the loading end of said conveyor from said conveying means, and means for fixedly securing the end of said guide plates adjacent the loading end of said conveyor at a predetermined spaced apart distance from said conveying means.

References Cited in the file of this patent
UNITED STATES PATENTS

| | | |
|---|---|---|
| 680,261 | Lyman | Aug. 13, 1901 |
| 871,176 | McCargar | Nov. 19, 1907 |
| 1,618,721 | Norman | Feb. 22, 1927 |
| 1,929,777 | Furman | Oct. 10, 1933 |
| 2,005,758 | Shilery | June 25, 1935 |
| 2,464,774 | Keiper | Mar. 15, 1949 |
| 2,827,241 | Downs | Mar. 18, 1958 |